UNITED STATES PATENT OFFICE.

JAMES ROBERT DRY, OF LONDON, ENGLAND.

TREATMENT OF FLAX, &c.

SPECIFICATION forming part of Letters Patent No. 314,921, dated March 31, 1885.

Application filed October 13, 1884. (No specimens.) Patented in England March 15, 1883, No. 1,388; in France April 27, 1883, No. 155,138; in Belgium May 1, 1883, No. 61,282, and in India September 7, 1883, No. 153.

*To all whom it may concern:*

Be it known that I, JAMES ROBERT DRY, a subject of the Queen of Great Britain, residing in London, England, have invented a certain new and useful Improvement in the Preparatory Treatment of Flax and other like Straws and Fibrous Material, of which the following is a specification.

The object of this invention is a special treatment of flax and other like straw and fibrous material to clean it from vegetable, resinous, and glutinous matter.

According to my invention I take flax and other like straws or fibrous material in a green or a dry state and immerse them in a bath of cold water containing a mixture of borax and black and yellow soap to soften the fiber. The bath is then brought to a boiling-point or near thereto, and kept so for about three hours, according to the quality of material under operation. The quantities of borax and soap will depend upon the state, substance, and nature of the fibrous body to be acted upon—say from ten to eighteen hundred-weight to one ton of fiber. This loosens the rosin and other glutinous matter contained in the fiber, and causes them to dislodge themselves from actual contact. When the straws are so treated, they are removed and rinsed in a hot solution of soda to remove the saponaceous matter, and then in clear cold water to rinse out the soda. This cold-water bath may contain a small proportion of sulphuric acid to neutralize the soda and render the flax flaccid. The flax is then rinsed in clear cold water. The straws thus treated are then dried either artificially or by exposure to the air previous to being broken and scutched.

The deposit of the first and also of the rinsing-bath will be available as manure, the liquor being useful for admixture with fresh baths for the treatment of fresh straws.

I am aware that flax has been treated by first boiling the same in a saponaceous solution, then washing the straw, and subsequently squeezing or pressing the same.

I am also aware that hemp and other fibrous material has been reduced to a pulp for the manufacture of fabrics by boiling the same in a solution of soda-ash or caustic soda, borax, rosin or pitch, and soap; but such processes are not claimed by me.

I claim as my invention—

1. The process herein described of treating flax, straw, and other fibrous material, which consists in subjecting the dry or green material to the action of a bath of cold water, borax, and soap to soften the fiber, then heating the bath to or near a boiling-point to loosen the rosin and other glutinous matter, and then washing the material to remove the saponaceous matter, and finally drying the material preparatory to scutching.

2. The process herein described of treating flax, straw, and other fibrous material, which consists in subjecting the material to the action of a bath of cold water, borax, and soap to soften the fiber, then heating the bath to loosen the rosin and other glutinous matter, then washing the material in a hot solution of soda to remove the saponaceous matter, and then rinsing the material in cold water to remove the soda.

In witness whereof I have hereunto signed my name in the presence of two subscribing witnesses.

JAMES ROBERT DRY.

Witnesses:
 RICHARD CORE GARDNER,
 JAMES GEORGE NEWMAN,
 *Both of 166 Fleet Street, London, England.*